(12) United States Patent
Wu

(10) Patent No.: US 6,423,963 B1
(45) Date of Patent: Jul. 23, 2002

(54) SAFETY LATCH FOR RAMAN AMPLIFIERS

(75) Inventor: Yongan Wu, Sunnyvale, CA (US)

(73) Assignee: Onetta, Inc., Sunnyvale, CA (US)

(*) Notice: Subject to any disclaimer, the term of this patent is extended or adjusted under 35 U.S.C. 154(b) by 159 days.

(21) Appl. No.: 09/626,092

(22) Filed: Jul. 26, 2000

(51) Int. Cl.$^7$ .................................................. G01J 1/04
(52) U.S. Cl. ........................... 250/227.14; 250/227.19; 250/205
(58) Field of Search ..................... 250/227.14, 227.15, 250/227.16, 227.18, 227.19, 227.23, 205; 340/555–557; 359/160; 356/32, 73.1

(56) References Cited

U.S. PATENT DOCUMENTS

| | | | |
|---|---|---|---|
| 4,379,289 A | 4/1983 | Peek | 340/555 |
| 4,651,317 A | 3/1987 | Tashiro et al. | 380/86 |
| 4,745,612 A | 5/1988 | Hayakawa et al. | 372/45 |
| 5,039,194 A | 8/1991 | Block et al. | 383/88 |
| 5,136,410 A | 8/1992 | Heiling et al. | 359/110 |
| 5,189,679 A | 2/1993 | Derry et al. | 372/45 |
| 5,208,183 A | 5/1993 | Chen et al. | 437/129 |
| 5,218,613 A | 6/1993 | Serreze | 372/45 |
| 5,287,377 A | 2/1994 | Fukuzawa et al. | 372/45 |
| 5,345,456 A | 9/1994 | Dai et al. | 372/22 |
| 5,428,471 A | 6/1995 | McDermott | 359/177 |
| 5,430,759 A | 7/1995 | Yokev et al. | 375/202 |
| 5,945,668 A | 8/1999 | Davidson | 250/227.15 |
| 5,946,129 A | 8/1999 | Xu et al. | 359/332 |
| 6,014,235 A | 1/2000 | Norte | 359/109 |
| 6,028,875 A | 2/2000 | Knight et al. | 372/46 |
| 6,052,222 A | 4/2000 | Kitamaura | 359/344 |
| 6,122,306 A | 9/2000 | Sartorious et al. | 372/96 |
| 6,141,477 A | 10/2000 | Kitamura | 385/313 |
| 6,192,058 B1 | 2/2001 | Abeles | 372/6 |
| 6,215,805 B1 | 4/2001 | Sartorious et al. | 372/50 |
| 6,317,255 B1 * | 11/2001 | Fatehi et al. | 359/177 |

OTHER PUBLICATIONS

Silver et al. "Design and ASE Characteristics of 1550–nm Polarization Insensitive Semiconductor Optical Amplifiers Containing Tensile and Compressive Wells" IEEE Journal of Quantum Electronics, vol. 36, No. 1, pp. 118–122, Jan., 2000.

Ryu et al. "Fabrication and Analysis of Polarization Insensitive 1.55um InGaAsP/InP Quantum Well Semiconductor Optical Amplifiers" p. 642, Sep. '98.

Liu et al. "A Study on the Polarization Sensitive Performance of the Strained Quantum Well Semiconductor Optical Amplifiers." SPIE vol. 3896, pp. 494–498 Nov., Dec., 1999.

Schimpe et al. "Compact 2×2 Switch with Optical Amplifier Gates" CLEO, 1994, p. 77 (Month Unknown).

Kitamura et al. "Angled Facet S–Bend Semiconductor Optical Amplifiers for High–Gain and Large–Extinction Ratio" IEEE Photonics Technology Letters, vol. 11, No. 7 (Jul., 1999), pp. 788–790.

Saini et al. "Lossless 1×2 Optical Switch Monolithically Integrated on a Passive Active Resonant Coupler (PARC) Platform" IEEE Photonics Technology Letters, vol. 12, No. 7, Jul. 2000, pp. 840–842.

* cited by examiner

Primary Examiner—Que T. Le
(74) Attorney, Agent, or Firm—Fish & Neave

(57) ABSTRACT

A method and apparatus for shutting off a source of optical power to an optical fiber in the event of a cut in the fiber are disclosed. Embodiments of the invention are particularly suited in fiber optic communications systems that use Raman pumps for signal amplification. Optical power from the pump to a fiber is shut off in response to a change in a supervisor signal provided to a first end of the fiber. The supervisor signal is generally operated in an "always-on" mode to provide for fail-safe operation. The apparatus generally comprises a controller coupled to the source of optical power and means for coupling a supervisor signal, which has been provided to a first end of the fiber, to the controller. The method and/or apparatus may be incorporated into an optical communications system having an optical fiber and two or more hubs coupled to the fiber.

31 Claims, 5 Drawing Sheets

SAFETY LATCH FOR RAMAN AMPLIFIERS

FIELD OF THE INVENTION

This invention relates generally to fiber optic communication. More particularly, it relates to safety mechanisms for Raman pump sources.

BACKGROUND ART

Modern communications systems often rely on optical fibers to transmit signals over long distances. Multiple fibers can be bundled together to form a fiber cable. An optical fiber can carry a greater density of signal channels than an electrically conductive wire of the same thickness. Optical communications systems sometimes reserve one of the signal channels for the purpose of communicating system parameters such as component temperature, pump power, and on/off status. Because the optical signal tends to attenuate over the length of the fiber, optical communications systems often employ amplifiers every few kilometers along a given fiber to maintain the signal intensity above some noise level. The amplifier boosts the level of the signal for transmission along the next segment of fiber. A recent development in the field of optical communications is the use of a Raman pump to amplify optical signals. A Raman pump provides radiation having a wavelength in vacuum typically between 1200 nanometers and 1500 nanometers. The pump radiation pumps energy into an optical signal in the fiber through a core field that is distributed along the length of the fiber. The Raman pump radiation usually propagates in a direction counter to the direction of propagation of the optical signal. As a result the intensity of an optical signal tends to decay at first and then increase in intensity as it approaches the Raman pump.

Unfortunately, the level power produced by a Raman pump presents a potential safety hazard. An optical power above 5 mW is considered eye-unsafe. A Raman pump, however, produces radiation at a very high power level, typically 200 mW to 2 Watts. This level of power represents an extreme eye-safety hazard should a fiber carrying Raman pump radiation be accidentally cut or disconnected. Thus a Raman-pump-based optical communications system preferably includes a fail-safe mechanism that turns off the Raman pump in the event of an accidental cut or disconnection of the fiber. However, prior art eye safety systems have not yet considered the extreme hazard present by the Raman pump.

For example, U.S. Pat. No. 5,945,668 describes a fiber optic safety interlock that uses a cable having a wire and an optical fiber. The wire carries a signal from a transmitter to a receiver. The receiver is coupled to a power supply that provides optical power to the fiber. If the fiber is cut the wire is also cut and the receiver turns off the power supply. Unfortunately this system is neither fail-safe nor reliable. There may be a considerable delay between the time the fiber is cut and the time the wire is cut. The delay may be long enough to cause eye damage. It is also possible that the wire may not be cut when the fiber is cut. Furthermore, it is possible that the wire may be cut when the fiber is not cut. Such a situation would trigger a false alarm.

U.S. Pat. No. 5,428,471 describes a fail-safe automatic shutdown system for a two-way fiber optic communications system. This system uses a pair of fibers with each fiber in the pair carrying signals in a direction opposite that of the other fiber. The system uses continuity signals transmitted over both fibers to shut down amplifiers on the upstream side of a cut in one of the fibers. The system relies on a cut in one fiber to trigger a shutdown of a first amplifier on the other fiber. The shutdown of the first amplifier triggers a shutdown of a second amplifier coupled to the fiber that was cut. Under certain circumstances a signal triggering a shutdown might travel the entire length of the fiber twice before the system actually shuts down. Furthermore, such a system will not work with a single fiber.

U.S. Pat. No. 5,136,410 describes an optical fiber link control safety system for two-way traffic on a single fiber. This system uses the optical signals carried by the fiber to trigger a shutdown of signal power if the fiber is cut. However, at certain times there may be no signal at all on the fiber, e.g., when all signal channels are dropped. This is not a problem for signal power. However, in Raman pumped systems, is the Raman pump is usually on whether a signal is present or not. If a fiber cut occurs when the signal power is off and the pump is on the Raman pump will not be shut off.

There is a need, therefore, for a reliable Raman safety latch that shuts off the pump in minimal time in the event of a cut or disconnection of the fiber.

OBJECTS AND ADVANTAGES

Accordingly, it is a primary object of the present invention to provide a safety latch that turns off the Raman pump quickly enough to prevent eye damage in the event of a fiber cut. It is a further object of the invention to provide such a safety latch that operates in a fail-safe mode. It is an additional object of the invention to provide safety latch that detects a cut in a fiber without requiring the use of an additional fiber or wire. It is a further object of the invention to provide a safety latch for a Raman fiber pump that operates reliably while reducing the probability of a false alarm.

SUMMARY

These objects and advantages are attained by a method and apparatus for shutting off optical power to an optical fiber in the event of a cut in the fiber. According to a first embodiment, the method generally comprises providing a supervisor signal to a first end of the fiber and shutting off the optical power to the fiber in response to a loss of or change in the supervisor signal at a second end of the fiber. The supervisor signal is generally operated in an "always-on" mode to provide for fail-safe operation. The supervisor signal may also be pulsed, i.e., quasi always-on. The method is particularly applicable to high power (e.g., >200 milliwatts (mW)) source such as a fiber pump. It is also desirable that the supervisor signal be an eye-safe signal to reduce hazards to eye-safety. In a particular embodiment, the optical power source is a Raman pump. In the present method it is desirable to turn off the power to the fiber within an eye-safe time after the fiber has been cut. To this end it preferable that the supervisor signal propagate in a direction opposite that of radiation from the optical power source. The supervisor signal may include an auxiliary supervisor signal, such as an optical communications signal carried by the fiber or optical power from the optical power source, where the optical power has been reflected from a cut in the fiber.

A second embodiment of the invention provides an apparatus for shutting off a source of optical power to a fiber in the event of a cut in the fiber. The apparatus generally comprises a controller coupled to the source of optical power and means for coupling a supervisor signal, which has been provided to a first end of the fiber, to the controller. The source of optical power is operable in response to signals from the controller. The controller responds to the supervisor signal by shutting off the power source if the supervisor signal is not present at a second end of the fiber.

The method of the first embodiment and/or apparatus of the second embodiment may be incorporated into an optical communications system according to a third embodiment of the invention. The optical communications system generally comprises an optical fiber and two or more hubs coupled to the fiber. A first hub includes a Raman pump coupled to the first end of the fiber and a controller coupled to both the first end of the fiber and the Raman pump. A second hub includes an optical signal source coupled to the second end of the fiber and a supervisor signal source coupled to the second end of the fiber. The controller shuts off pump radiation from the Raman pump to the fiber if the Raman pump is on and a supervisor signal from the supervisor signal source is not present at a first end of the fiber.

The method of the first embodiment may be implemented in the form of a processor readable code embodied in a processor readable medium. The code may operate a processor controllable apparatus according to a fourth embodiment of the invention. Such an apparatus may be part of an optical communications system, such as the system of the third embodiment.

The various embodiments of the present invention provide for a fail-safe means of turning off a source of optical power and thereby reducing an eye-safety hazard resulting from a cut in an optical fiber. By using a supervisor signal separate from the optical communications signals carried by a fiber optic network, the system is less susceptible to false alarms than prior art systems. Furthermore, if the supervisor signal propagates opposite the radiation from the source, the various embodiments respond faster to a cut in the fiber.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention is set forth without any loss of generality to, and without imposing limitations upon, the claimed invention.

Figure 1:
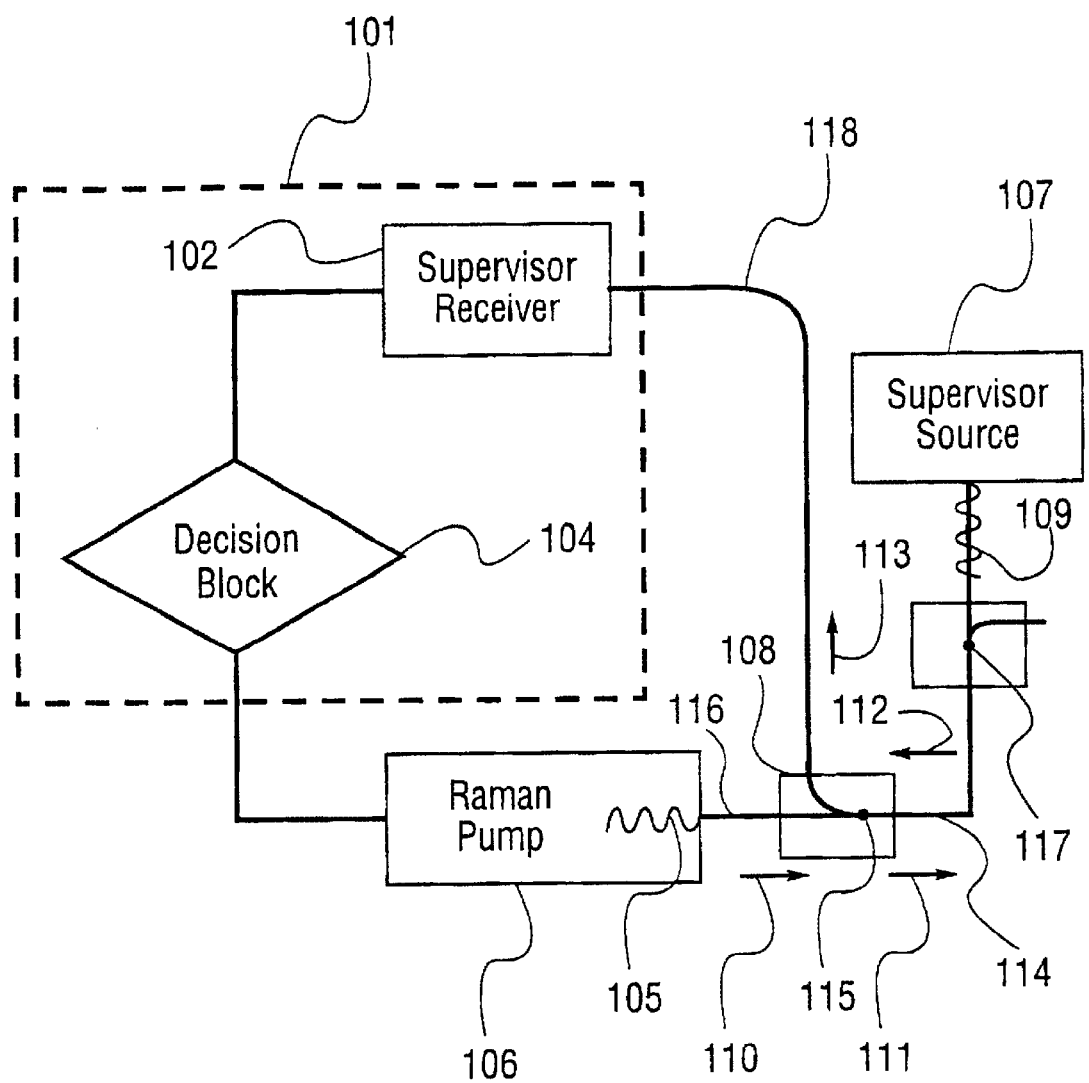
FIG. 1 depicts a simplified schematic diagram of an apparatus for turning off a source of optical power according to first embodiment of the present invention.

An apparatus for turning off an optical power source according to a first embodiment of the invention is shown in the simplified schematic diagram of FIG. 1. A corresponding method is depicted in the flow diagram of FIG. 2. Although the following discussion describes the method with respect to turning off a Raman pump, the method may be applied to any type of optical power source that presents an eye safety hazard.

As used herein, the term "radiation" refers to electromagnetic oscillations or waves. More specifically, "optical radiation" and "optical power" refer to radiation having a frequency falling in a frequency range roughly spanning from the infrared to the ultraviolet. This frequency range roughly corresponds to a range of wavelengths (in vacuum) from about 10 microns to about 10 nanometers.

Referring to FIG. 1, the apparatus 100 generally comprises a control unit 101 that controls a source of optical power, e.g. a fiber pump such as a Raman pump 106. Alternatively, the source of optical power may be an erbium-doped fiber amplifier (EDFA) pump source, an optical signal source or laser that provides optical power at an eye-unsafe level. The control unit 101 includes a supervisor channel receiver 102 coupled to a decision block 104. The Raman pump 106 and supervisor receiver 102 are coupled to a first end of 115 of an optical fiber 114, e.g., via fibers 116, 118 and an optical coupler 108. The coupler 108 may be an optical interleaver, wavelength division multiplexing (WDM) module, WDM coupler, tap, optical circulator, or the like. The Raman pump provides high intensity pump radiation 105 for amplifying an optical signal (not shown) on the optical fiber 114. The pump radiation 105 travels through the fibers 116 and 114 in the directions shown by the arrows 110 and 111. The Raman pump 106 typically provides the pump radiation 105 to the fiber at an optical power of 200 mW or greater.

The supervisor channel receiver 102 receives a supervisor channel from a supervisor channel source 107 connected to a second end 117 of the fiber 114. The supervisor channel receiver 102 receives a supervisor signal 109 provided by the source 107 and transmitted along the fibers 114 and 118. The supervisor signal 109 travels along the fibers 114 and 118 as shown by the arrows 112 and 113 respectively.

It is desirable that the controller 101 turn off the Raman pump 106 within an eye-safe time after a cut in the fiber 114 in response to a change in the supervisor signal 109 resulting from the cut. In a preferred embodiment, the supervisor signal 109 and radiation from the Raman pump 106 propagate in opposite directions through the optical fiber 114. This way, the maximum time delay between a cut in the fiber and turning off the Raman pump 106 is just the length of the fiber 114 divided by the speed of light in the fiber 114.

The supervisor signal 109 acts as a fail-safe mechanism for the Raman pump 106. As long as the supervisor channel receiver 102 receives the supervisor signal 109 above a threshold level, the supervisor channel receiver 102 provides a first output to the decision block 104. If the supervisor channel receiver 102 does not receive the supervisor signal 109, the supervisor channel receiver provides a second output to the decision block 104. As long as the decision block 104 receives the first output from the supervisor channel receiver 102, the decision block 104 does not turn off the Raman pump 106. However, if the supervisor receiver 102 provides the second output to the decision block 104 the decision block 104 turns off the Raman pump 106. The decision block 104 can also turn the Raman pump 106 back on once the supervisor channel receiver 102 receives the supervisor signal 109 again.

In a preferred embodiment, the supervisor channel source 107 operates in an always-on mode, i.e. as long is the pump 106 is supposed to be turned on, supervisor channel source provides the supervisor signal. Therefore, in the event of a failure of the supervisor channel source 107 or a cut in the fiber 114 the Raman pump will be turned off. In the context of the present invention, a disconnection of the fiber 114 at either of its ends or anywhere along its length may be regarded as a cut. To reduce the probability of false alarms due to a loss of the supervisor signal 109, the supervisor channel source 107 is preferably a highly reliable light source such as a distributed feedback (DFB) laser. Furthermore, it is preferable that the supervisor channel source 107 provide an eye-safe supervisor signal 109.

If the supervisor signal 109 is not an eye-safe signal, it is desirable to ensure that the supervisor channel source 107 turns off the supervisor signal 109 within an eye-safe time in the event of a cut in the fiber 114. To achieve this, the supervisor channel source 107 may be coupled to a controller (not shown) that turns off the supervisor signal 109.

In the event of a cut in the fiber 114, the pump radiation may be reflected from a facet formed by the cut. It is therefore possible to use the pump radiation 105 reflected from the cut as the supervisor signal 109. In such a case, the supervisor channel receiver 102 would not normally receive the pump radiation 105 unless the fiber 114 were cut. This is equivalent to operating a supervisor channel source in a "normally off" mode. The presence of the Raman pump radiation 105 at the supervisor channel receiver 102 would trigger the decision block 104 to shut off optical power from the pump 106 to the fiber 114. However, if the cut forms a facet at an angle of about 5° or greater with respect to a plane perpendicular to an axis of the fiber 114, the reflected pump radiation 105 may not be reflected back into the fiber 114. Although a cut with a facet angle of more than 5° or random breakup than a cut with a facet angle of more than 5°, fail-safe operation requires the less likely situation be taken into account. Thus, it is generally desirable to provide an additional supervisor signal 109 as a back up in case the fiber is cut and the reflected pump light doesn't reach the supervisor channel receiver 102.

The pump radiation 105 may also amplify the supervisor signal 109. If the power of the pump radiation 105 decreases due to a problem with the Raman pump 106, the power of the supervisor signal 109 might decrease below the threshold for triggering the shut-off of the Raman pump. Thus, the supervisor channel receiver 102 might interpret a decrease in the power of supervisor signal 109 as a cut in the fiber triggering a false alarm. In such a case it is useful for the supervisor channel receiver 102 to adjust the power threshold for triggering the change from the first output to the second output. This way the supervisor channel receiver can compensate for a drop in the power of the supervisor channel 109 when the pump radiation 105 from the Raman pump 106 is reduced or turned off but the fiber 114 is not cut. Alternatively, the supervisor channel source 107 may increase the power level of the supervisor signal 109 in response to a decrease in the power of the pump radiation 105 so that a loss of pump radiation 105 does not trigger a false alarm. Furthermore, the supervisor channel source 107 may control a power level of the supervisor signal 109 independently of any communications signal travelling over the fiber 114.

Thus, the power of the supervisor signal 109 may be adjusted to suit the application for which the apparatus 100 is used.

The supervisor channel receiver 102 and decision block 104 may be implemented in software or hardware or some combination of both. For example, the supervisor channel receiver may include a device for converting optical energy to an electrical signal. Such devices include photodiodes, photoresistors, photoelectric devices and the like. The decision block 104 may comprise a transistor, relay or other device that switches off power to the Raman pump 106 in response to a signal or change in signal from the supervisor channel receiver 102. Alternatively, the decision block may be coupled to a device, such as the coupler 108 that shuts off the flow of radiation 105 from the Raman pump 106 into the fiber 114. The supervisor channel receiver 102 and decision block 104 thus, act together to provide a safety interlock for the Raman pump 106.

An apparatus of the type depicted in FIG. 1 may operate according to a method according to a second embodiment of the present invention. The method 200 optionally begins with the provision of a supervisor signal at 202. Preferably, the supervisor signal, such as signal 109 is an eye-safe signal. The supervisor signal may carry information for characterizing a state of the apparatus 100 or an optical communications system of which it is a part. At 204, if the supervisor signal is not present at the end of a fiber, such as fiber 114 of FIG. 1, a source of optical power, such as Raman pump 106, is shut off at 206. Alternatively, if the supervisor signal is not provided, e.g. if the fiber is cut or supervisor channel source is not turned on, and the Raman pump is off, the source of optical power is prevented from being turned on. The decision block 104 of FIG. 1 may implement steps 204 and 206 of the method 200.

It is desirable that the apparatus 100 and/or method 200 be sufficiently robust in design to reduce the probability of a false alarm. A false alarm generally refers to a situation in which the decision block 104 triggers a shut-off of the Raman pump when the fiber 114 has not been cut. One possible situation in which a false alarm could occur would be a failure of the supervisor channel source 107. A possible back-up to reduce the probability of such a failure from triggering a false alarm would be to utilize an optical communications signal (not shown) travelling from the second end 117 to the first end 115 of the fiber 114 as an auxiliary supervisor signal. The coupler 108 can couple a portion of the communications signal from the fiber 114 to the supervisor channel receiver 102 in the event of a loss of the supervisor signal 109. Such a method is fail-safe in that a cut in the fiber 114 would still trigger a shut-off of the Raman pump 106. A false alarm would occur in the event of a simultaneous loss of the both the supervisor signal 109 and the optical communications signal. Providing an auxiliary supervisor signal, such as an optical communications signal, as a back-up to the supervisor signal 109 makes the method and apparatus more robust since a simultaneous loss of the optical supervisor signal 109 and the auxiliary supervisor signal is typically a less likely event than a loss of one supervisor signal but not the other. The likelihood of a false alarm may be further reduced by coupling both an optical communications signal and pump radiation 105 reflected from a cut in the fiber 114 to the supervisor channel receiver 102.

Figure 2:
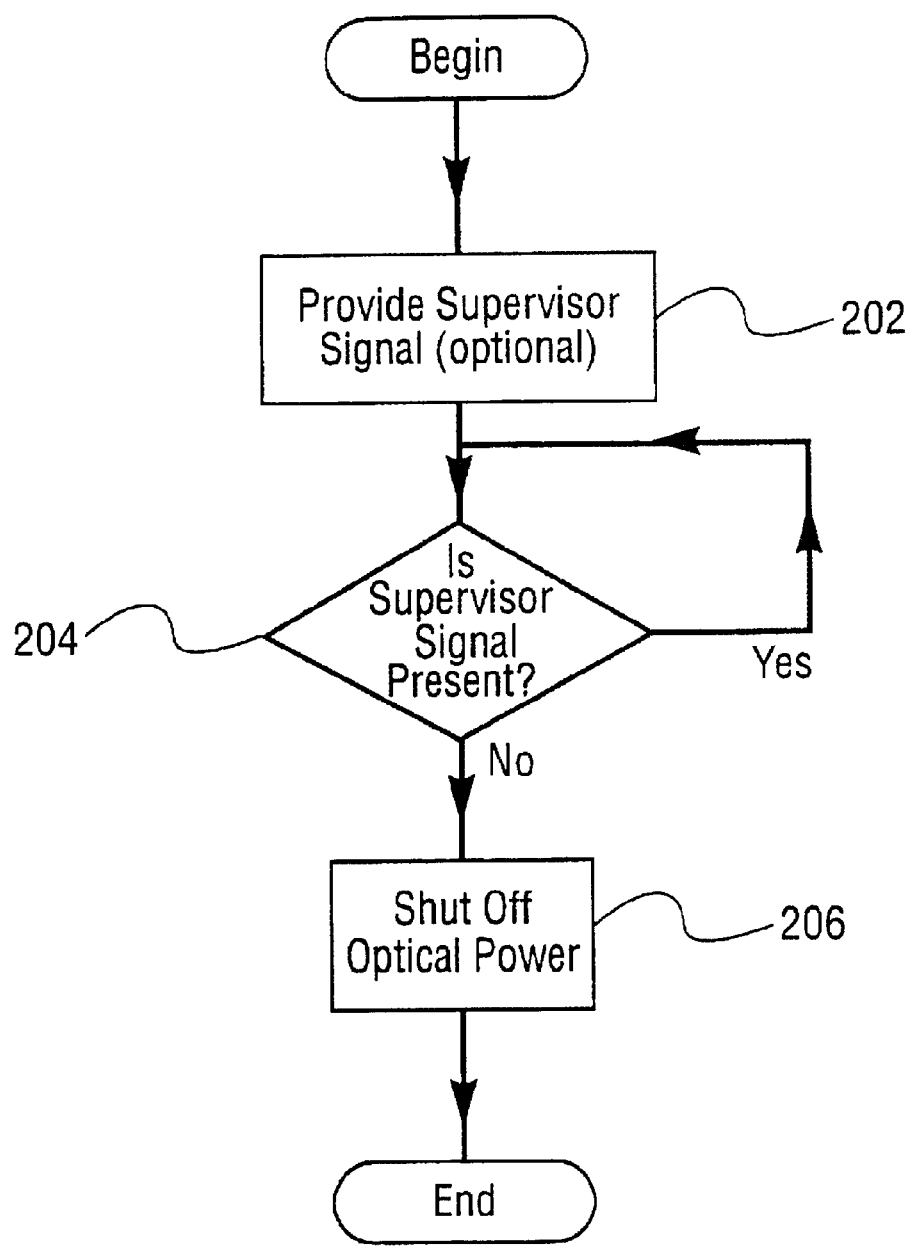
FIG. 2 depicts a flow diagram of a method of turning off a source of optical power according to a second embodiment of the present invention.
Figure 3:
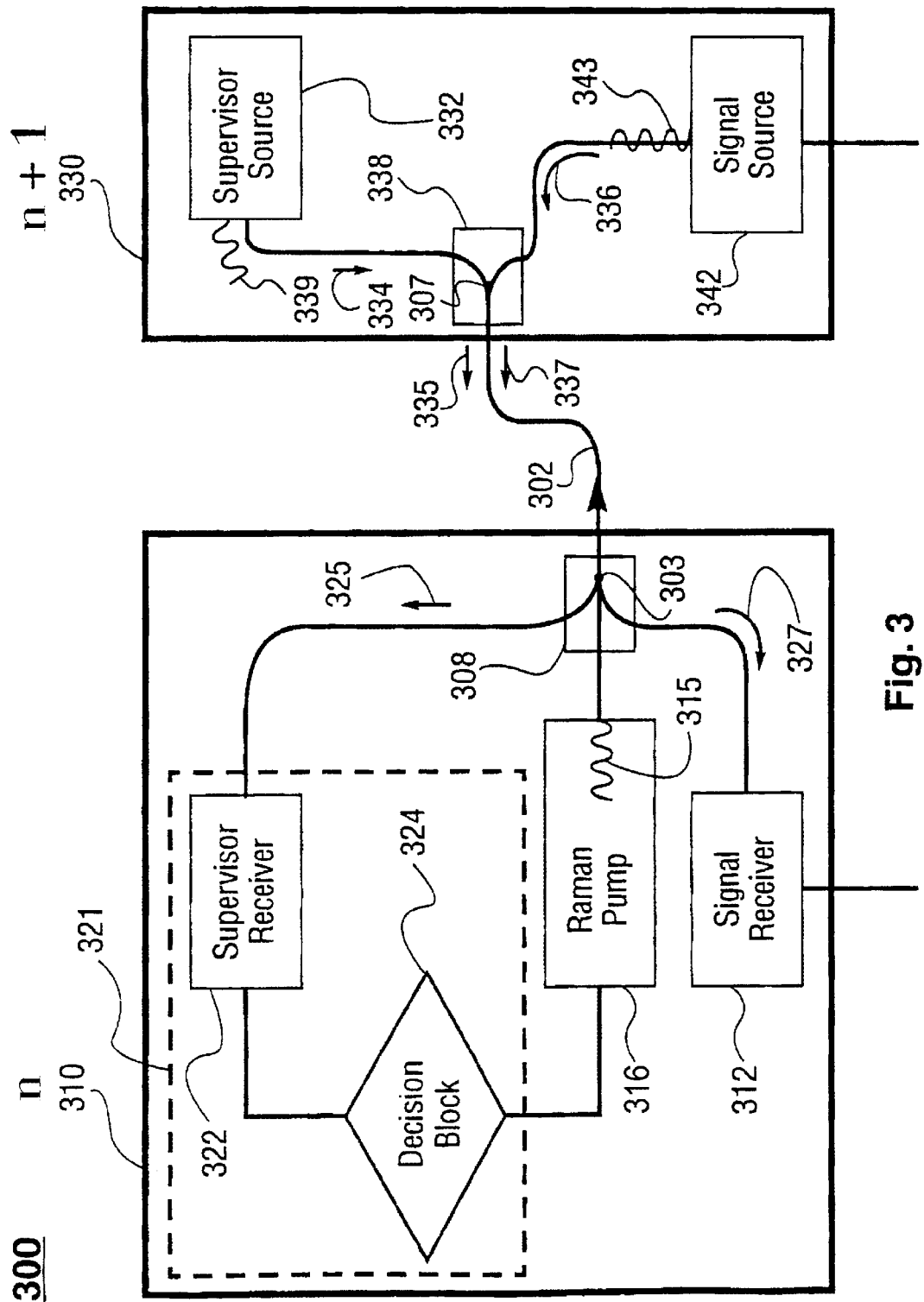
FIG. 3 depicts a simplified schematic diagram of a fiber optic communication system according to a third embodiment of the present invention.

An apparatus of the type depicted above with respect to FIG. 1 and/or a method of the type depicted above with respect to FIG. 2 may be implemented in a communications system. FIG. 3 depicts a simplified schematic diagram of a fiber optic communication system 300 according to a third embodiment of the present invention. The system generally comprises a first hub 310 and a second hub 330 coupled to each other by an optical fiber 302. The hubs 310, 330 represent two hubs out of a plurality of two or more hubs in the system 300. Hub 310 generally comprises a signal receiver 312, and a controller 321 coupled to a Raman pump 316. The controller contains a supervisor channel receiver 322 coupled to a decision block 324. The decision block 324 is coupled to the Raman pump 306. The signal receiver 312, Raman pump 316, and supervisor channel receiver 322 are coupled to a first end 303 of the fiber 302, e.g., by an optical coupler 308. The controller 321, Raman pump 316, and optical coupler 308 have features in common with the controller 101, Raman pump 106 and optical coupler 108 described above with respect to FIG. 1. Furthermore, the controller 321 may implement a method for turning off the Raman pump 316 in a manner having features in common with the method 200 of FIG. 2. The Raman pump produces high intensity pump radiation 305 that is transmitted to the optical fiber 302.

The second hub 330 generally comprises a supervisor channel source 332 and a signal source 342 coupled to a second end 307 of the optical fiber 302, e.g., at an optical coupler 338. The supervisor channel source 332 provides a supervisor signal 339 that is transmitted over the optical fiber 302 to the supervisor channel receiver as shown by the arrows 334, 335, and 325. In a preferred embodiment, the supervisor signal travels in a direction opposite that of the pump radiation 315 to minimize the time between a cut in the fiber 302 occurs and the controller 321 shuts off the Raman pump. More specifically, it is desirable that the controller 321 turn off the Raman pump 316 within an eye-safe time after a cut in the fiber 302 in response to a change in the supervisor signal 339 resulting from the cut. Furthermore, the supervisor signal 339 is preferably an eye-safe signal. The signal source 342 provides an optical communications signal 343 that is transmitted over the optical fiber 302 to the signal receiver 312 as shown by the arrows 336, 337 and 327. The pump radiation 315 amplifies the optical signal in the fiber 302. The pump radiation may also amplify the supervisor signal 339 as well.

The supervisor channel source 332 may control a power level of the supervisor signal 339 independently of the communications signal 343. Thus, the power of the supervisor signal 339 may be adjusted to suit the application for which the system 300 is used. It is also possible to use the communications signal 343 as a back-up supervisor signal as described above with respect to FIG. 1 and FIG. 2. In such a case, the supervisor channel source 332 provides the supervisor signal 339 when the communications signal 343 is not present at the first end 303 of the fiber 302. Furthermore, the controller 321 does not shut off the pump radiation 315 to the fiber 302 if the supervisor signal 339 is off and the optical communications signal 343 from the optical communications signal source 342 is detected at the hub 310.

Either or both of the signal source 342 and the signal receiver 312 may be transceiver modules coupled to each other via fiber 302 for two-way traffic or coupled to other optical fibers (not shown). Such other fibers may include trunk fibers connecting the hubs 310, 330 to other hubs (not shown), and local fibers that connect the hubs to local users (not shown). The transceiver modules may include multiplexing, demultiplexing and routing capabilities. Furthermore, hub 310 may include a supervisor source signal source analogous to the sources 332, 342 in hub 330. Similarly, hub 330 may contain a Raman pump, signal receiver, and controller analogous to pump 316, receiver 312 and controller 321 of hub 310. Hubs 310 and 330 may be part of a communications network of multiple hubs connected by fibers. Information regarding a fiber cut between the nth hub and the $(n+1)^{th}$ hub may be communicated to the other hubs by way of fibers connecting hubs prior to the cut (i.e., hubs n−1, n−2, etc.) and hubs beyond the cut (i.e., hubs n+2, n+3, etc). Alternatively, this information may be transmitted through other communication methods such as wireless, DSL, Ethernet, and the like, to inform the whole system of the need for repair and/or to reroute communications traffic around the cut.

Figure 4:
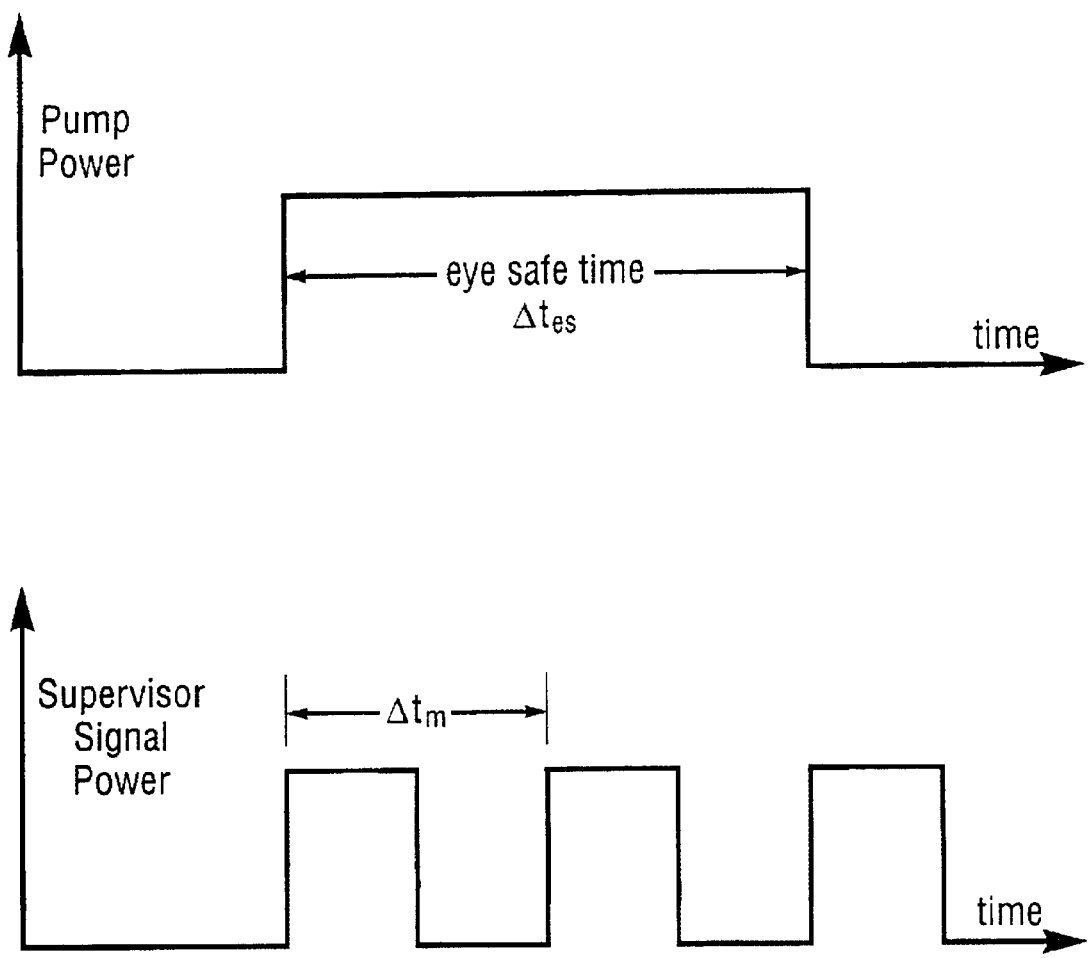
FIG. 4 depicts a timing diagram illustrating a modulated supervisor signal according to an alternative embodiment of the present invention.

As stated above, the apparatus of FIG. 1 and method of FIG. 2 and system of FIG. 3 preferably use an eye-safe source to provide a supervisor signal. For the purposes of the present discussion, eye-safe refers to a signal having an eye-safe power level, e.g. less than 5 mW or a signal that can be shut off within an eye-safe time after a cut. Furthermore it is preferably that the various embodiments of the invention shut off an eye-unsafe optical power source within an eye-safe time after a cut in a fiber. The eye-safe time is dependent on the wavelength and power level of the radiation provided by the Raman pump and the physiology of the eye. In general, the eye-safe time is inversely dependent on the optical power of the signal provided to the fiber: the higher the power, the shorter the eye-safe time. Although it is preferable to operate the supervisor channel source in an always-on mode, it is often desirable to modulate the supervisor signal. Therefore, for the purposes of the embodiments of the present invention, the terms "always-on" and "modulated" are not exclusive of each other. A pulsed supervisor channel source may be regarded as operating in a "quasi always-on" mode. If the supervisor signal is modulated, e.g. by pulsing it on and off, the supervisor signal can be considered "on" if a modulation period of the supervisor signal is shorter than the eye-safe time for the Raman pump. This is depicted in the timing diagrams of FIG. 4. The upper diagram depicts pump power as a function of time. An eye-safe time is indicated as $\Delta t_{es}$. The lower diagram depicts supervisor signal power as a function of time. The modulation period of the supervisor signal is indicated as $\Delta t_m$. The controller that controls the Raman pump signal power turns off the if the supervisor signal remains off for a time $\Delta t_{off}$ greater than $\Delta t_m$, but less than $\Delta t_{es}$.

The exact value of $\Delta t_{off}$ will depend on the length L of the fiber between the supervisor signal source and the supervisor signal receiver, the index of refraction n of the fiber, a reaction time $\Delta t_c$ of the controller, a margin of safety M, and $\Delta t_{es}$ and $\Delta t_m$. L and n determine a maximum signal travel time $\Delta t_{max}$ from a cut in the fiber to the supervisor channel receiver. If the supervisor channel source and receiver are located at hubs connected to opposite ends of a fiber as shown in FIG. 3, the supervisor signal travels in a direction opposite that of the radiation from the pump. The maximum distance the supervisor signal would travel from a cut in the fiber to the controller is approximately the length L of the fiber. In such a case $\Delta t_{max}$ is given approximately by:

$$\Delta t_{max} = nL/c,$$

where c is the speed of light in vacuum.

For example, if L=80 km, n=1.5 and c=3×10$^5$ km/sec, $\Delta t_{max}$=(1.5) (80 km)/(3×10$^5$ km/sec)=4×10$^{-4}$ sec=0.4 ms.

In prior art systems that rely on two fibers, or a fiber and a wire, the supervisor signal could have to travel twice the length of the fiber. In such a case, $\Delta t_{max}=2nL/c$ or 0.8 ms using the numbers from the above example.

In general, $\Delta t_{off}$ falls in the range given by:

$$\Delta t_m < \Delta t_{off} < (\Delta t_{es} - \Delta t_c - \Delta t_{max})/M.$$

Those having skill in the art will know how to determine $\Delta t_c$ from the type of apparatus used to implement the controller.

Figure 5:
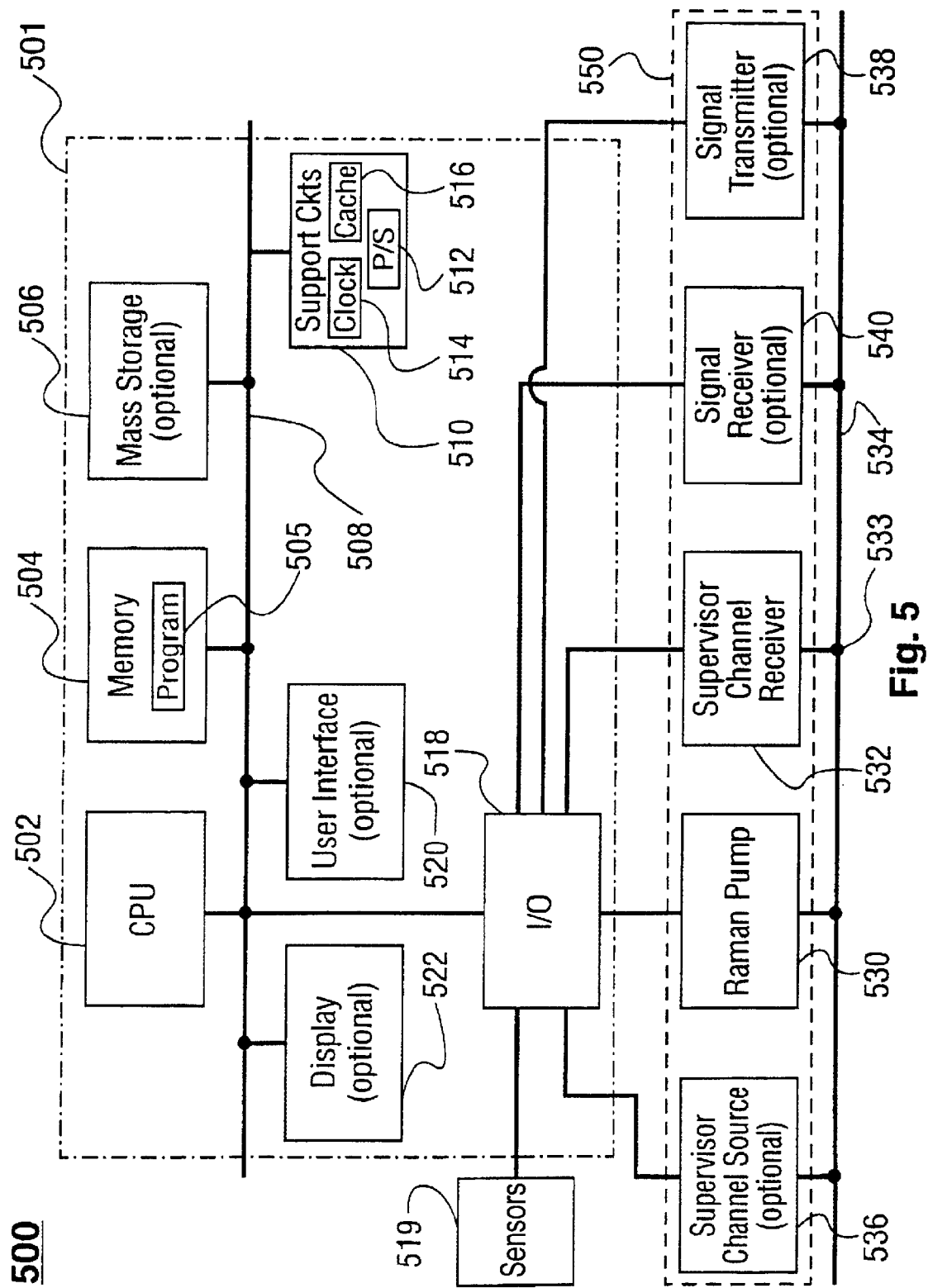
FIG. 5 depicts a block diagram of a computer apparatus for turning off a Raman pump according to a fourth embodiment of the present invention.

It is common for communications systems, such as the one described above with respect to FIG. 3, to provide a supervisor channel for system characterization. In such a case, the system may be reconfigured to implement the method of the present invention as set forth above with respect to FIG. 2. The method may be implemented in hardware, software, or a combination of both hardware and software. FIG. 5 depicts a block diagram depicting an apparatus 500 according to a fourth embodiment of the invention. In the apparatus 500, a method having features in common with method 200 of FIG. 2 is implemented as a computer program running on a processor of a computer controlled apparatus having features in common with the apparatus 100 described above with respect to FIG. 1.

The apparatus 500 includes a controller 501. The controller 501 includes a programmable central processing unit (CPU) 502 that is operable with a memory 504 (e.g., RAM, DRAM, ROM, and the like) an optional mass storage device, 506 (e.g., CD-ROM hard disk and/or removable storage), and well-known support circuits 510 such as power supplies 512, clocks 514, cache 516, input/output (I/O) circuits 518 and the like. The controller 501 also may optionally include hardware for monitoring the apparatus 500 through one or more sensors 519. Such sensors may measure system parameters such as temperature and pump power, optical signal power, communications signal power, etc. All of the above elements may be coupled to a control system bus 508.

The memory 504 contains instructions that the processor unit 502 executes to facilitate the performance of the apparatus 500. The instructions in the memory 504 are in the form of program code 505. The program code may conform to any one of a number of different programming languages. For example, the program code can be written in C+, C++, BASIC, Pascal, JAVA or a number of other languages. The mass storage device 506 stores data and instructions and retrieves data and program code instructions from a processor readable storage medium, such as a magnetic disk or magnetic tape. For example, the mass storage device 506 can be a hard disk drive, floppy disk drive, tape drive, or optical disk drive. The mass storage device 506 stores and retrieves the instructions in response to directions that it receives from the processor unit 502. The processor unit 502 operates the apparatus 500 using data and program code instructions that are stored and retrieved by the memory 504 and/or the mass storage device 506. The data and program code instructions may be first retrieved by the mass storage device 506 from a medium and then transferred to the memory 504 for use by the processor unit 502. The data and program code, instruction may also be updated through an outside computer or remote control systems (not shown).

The apparatus 500 may optionally include a user interface 520, such as a keyboard, mouse, or light pen, coupled to the processor unit 502 to provide for the receipt of inputs from an operator (not shown). The apparatus 500 may also optionally include a display unit 522 to provide information to the operator in the form of graphical displays and/or alphanumeric characters under control of the processor unit 502.

The control system bus 508 provides for the transfer of data and control signals between all of the devices that are coupled to the control system bus 508. Although the control system bus 508 is displayed as a single bus that directly connects the devices in the processor unit 502, the control system bus 508 can also be a collection of busses. For example, the display unit 522, user interface 520 and mass storage device 506 can be coupled to an input-output peripheral bus 508, while the processor unit 502 and memory 504 are coupled to a local processor bus. The local processor bus and input-output peripheral bus are coupled together to form the control system bus 508.

The system controller 501 is coupled to the elements of the apparatus 500, for turning off a source of optical power in accordance with embodiments of the present invention via the system bus 508 and the I/O circuits 518. These elements include the following: a source of optical power such as a Raman pump 530, and a supervisor channel receiver, 532, both of which are coupled to a first end 533 of an optical fiber 534. The system controller 501 provides signals to the above elements that cause these elements to perform operations for shut off the Raman pump 530 in response to a change in a signal received by the supervisor channel receiver 532, e.g. as a result of a cut in the fiber 534.

The steps of the method of the method described above with respect to FIG. 2 could be implemented by a suitable computer program running on the CPU 502 of the controller 501. The CPU 502 forms a general purpose computer that becomes a specific purpose computer when executing programs such as the program 505 of the embodiment of the method of the present invention depicted in the flow diagram of FIG. 2. Although the invention is described herein as being implemented in software and executed upon a general purpose computer, those skilled in the art will realize that the invention could be implemented using hardware such as an application specific integrated circuit (ASIC), microcontroller or other hardware circuitry. As such, it should be understood that the invention can be implemented, in whole or in part, in software, hardware or both.

Those skilled in the art would be readily able to devise a computer program 505 to implement the steps depicted in the flow diagram of FIG. 2. The program 505 is suitable for monitoring and controlling the Raman pump 530 in accordance with embodiments of the present invention. Although the program 505 is described herein with respect to a providing a safety interlock for a Raman pump, skilled in the art will recognize that programs embodying the method of the present invention can be applied to any source of optical power.

Furthermore, the apparatus 500 may be readily adapted to operate an optical communication system such as the optical communication system 300 described above with respect to FIG. 3. To implement such a system, the apparatus 500 may optionally include a supervisor channel source 536, a communications signal transmitter 538 and a communications signal receiver 540. In such a system, the supervisor channel receiver 532 and source 536, Raman pump 530, communications signal transmitter 538 and receiver 540 may all be incorporated in a hub 550 having features in common with the hubs 310 and 330 described above with respect to FIG. 3. The hub 550 may be one of a plurality of similar hubs connected together by optical fibers such as fiber 534. A supervisor signal provided by the supervisor channel source 536 may carry information that characterizes the state of the apparatus 500, the hub 550, the communications system, or all three. Such information may be provided by the sensors 519 or the various elements of the system, e.g., the supervisor channel receiver 532 and source 536, the Raman pump 530, the communications signal transmitter 538 and receiver 540.

The above embodiments provide for a fail-safe interlock that addresses the particular eye-safety hazards associated with the use of high power optical sources, such as Raman pumps in fiber optic systems. By using a supervisor signal separate from the optical communications signals carried by a fiber optic network, the system is less susceptible to false alarms than prior art systems. Reliability may be improved by providing the supervisor signal in an always on mode. Shut-off response time may be improved by propagating the supervisor signal in a direction opposite that of the radiation from the high power source, the various embodiments respond faster to a cut in the fiber. In the case Raman pumps are used in both ends of the fiber, decision block, safety control, and supervision channel source and receiver can be used in both ends of the fiber to take care of pump lasers at both ends. The pump laser power received from the other end's pump can also serve as another fiber cut indicator additional to the supervision signal.

It will be clear to one skilled in the art that the above embodiment may be altered in many ways without departing from the scope of the invention. For example, the decision block and supervisor channel receiver may be incorporated into a single device. Furthermore, the embodiments of the present system may also be used in conjunction with prior art interlock methods and apparatus to provide redundancy and an additional margin of safety. Accordingly, the scope of the invention should be determined by the following claims and their legal equivalents.

What is claimed is:

1. A method for shutting off a source of optical power to an optical fiber in the event of a cut in the fiber, comprising:
   a) providing a supervisor signal to a first end of the fiber; and
   b) shutting off the optical power to the fiber in response to a change in the supervisor signal at a second end of the fiber.

2. The method of claim 1 wherein the supervisor signal propagates through the fiber in a direction opposite that of radiation from the optical power source.

3. The method of claim 1 wherein the optical power source is turned off within an eye-safe time after a cut in the fiber.

4. The method of claim 1, wherein the change in the supervisor signal results from a cut in the fiber.

5. The method of claim 4 wherein the supervisor signal includes radiation from the optical power source that has been reflected from the cut in the fiber.

6. The method of claim 1 wherein the optical power is not shut off if the supervisor signal is not present at the second end of the fiber but the fiber is not cut and an auxiliary supervisor signal is present at the second end.

7. The method of claim 1 wherein the optical power source is a fiber pump.

8. The method of claim 7 wherein the fiber pump produces pump radiation at a power of about 200 mW or greater.

9. The method of claim 7 wherein the fiber pump produces pump radiation at a wavelength of between about 1200 nanometers and 1500 nanometers.

10. The method of claim 7 wherein the fiber pump is a Raman pump or several Raman pumps.

11. The method of claim 1 wherein the fiber carries an optical communications signal from a first hub to a second hub.

12. The method of claim 11, wherein the optical power is not shut off to the fiber if the supervisor signal is off and the optical communications signal is detected at the second hub.

13. The method of claim 11 further comprising rerouting the optical communications signal to a different fiber if the fiber is cut.

14. The method of claim 1, wherein the supervisor signal includes an eye-safe optical signal.

15. The method of claim 1, wherein the supervisor signal is pulsed.

16. The method of claim 1, wherein the supervisor signal is provided in an always-on mode.

17. An apparatus for shutting off a source of optical power to a fiber in the event of a cut in the fiber, comprising:
   a) a controller, coupled to the source of optical power, for shutting off optical power to the fiber in response to a change in a supervisor signal provided to a first end of the fiber is not present at a second end of the fiber; and
   b) means for coupling the supervisor signal to the controller.

18. The apparatus of claim 17 further comprising means, coupled to the fiber, for providing the supervisor signal.

19. The apparatus of claim 18 wherein the supervisor signal providing means provides an eye-safe optical signal as the supervisor signal.

20. The apparatus of claim 18, wherein the supervisor signal providing means pulses the supervisor signal.

21. The apparatus of claim 18, wherein the supervisor signal providing means provides the supervisor signal in an always-on mode.

22. The apparatus of claim 17, wherein the controller operates fast enough to turn off the optical power source within an eye-safe time after a cut in the fiber.

23. The apparatus of claim 17, wherein the optical power source is a fiber pump.

24. The apparatus of claim 23, wherein the fiber pump is a Raman pump.

25. The apparatus of claim 17 wherein the controller does not turn off the optical power if the supervisor signal is not present at the second end of the fiber but the fiber is not cut.

26. The apparatus of claim 17 further comprising means for providing an optical communications signal to the fiber.

27. An optical communications system, comprising:
   a) an optical fiber having a first end and a second end;
   b) a first hub, the first hub including a Raman pump coupled to the first end of the fiber and a controller coupled to both the first end of the fiber and the Raman pump;
   c) a second hub, the second hub including an optical signal source coupled to the second end of the fiber and a supervisor signal source coupled to the second end of the fiber;
   wherein the controller shuts off pump radiation from the Raman pump to the fiber in response to a change in the supervisor signal at a first end of the fiber.

28. The system of claim 27, wherein the controller does not shut off the pump radiation to the fiber if the supervisor signal is off and an optical communications signal from the optical communications signal source is detected at the first hub.

29. The system of claim 27 wherein the controller turns off the Raman pump within an eye-safe time after a cut in the fiber.

30. The system of claim 27 further comprising means, responsive to the supervisor signal, for characterizing the system.

31. An apparatus for shutting off a source of optical power to an optical fiber in the event of a cut in the fiber, comprising:
   a) means for providing a supervisor signal to a first end of the fiber; and
   b) means for shutting off the optical power to the fiber in response to a change in the supervisor signal at a second end of the fiber.

* * * * *